(12) United States Patent
Vestberg et al.

(10) Patent No.: US 9,994,656 B2
(45) Date of Patent: Jun. 12, 2018

(54) TWO-STAGE PROCESS FOR PRODUCING POLYPROPYLENE COMPOSITIONS

(71) Applicant: BOREALIS AG, Vienna (AT)

(72) Inventors: Torvald Vestberg, Porvoo (FI); Kauno Alastalo, Porvoo (FI)

(73) Assignee: BOREALIS AG, Vienna (AT)

( * ) Notice: Subject to any disclaimer, the term of this patent is extended or adjusted under 35 U.S.C. 154(b) by 120 days.

(21) Appl. No.: 14/914,865

(22) PCT Filed: Sep. 22, 2014

(86) PCT No.: PCT/EP2014/070070
§ 371 (c)(1),
(2) Date: Feb. 26, 2016

(87) PCT Pub. No.: WO2015/044059
PCT Pub. Date: Apr. 2, 2015

(65) Prior Publication Data
US 2016/0208032 A1 Jul. 21, 2016

(30) Foreign Application Priority Data

Sep. 27, 2013 (EP) .................................. 13186370

(51) Int. Cl.
| C08F 210/16 | (2006.01) |
| B29C 47/00 | (2006.01) |
| C08J 5/18 | (2006.01) |
| C08F 210/06 | (2006.01) |
| C08L 23/10 | (2006.01) |
| C08L 23/12 | (2006.01) |
| B29K 23/00 | (2006.01) |
| B29L 31/00 | (2006.01) |

(52) U.S. Cl.
CPC ........ C08F 210/16 (2013.01); B29C 47/0011 (2013.01); C08F 210/06 (2013.01); C08J 5/18 (2013.01); C08L 23/10 (2013.01); C08L 23/12 (2013.01); B29K 2023/12 (2013.01); B29L 2031/00 (2013.01); C08J 2323/16 (2013.01)

(58) Field of Classification Search
None
See application file for complete search history.

(56) References Cited

U.S. PATENT DOCUMENTS

| 3,223,764 A | 12/1965 | Kahn et al. |
| 3,242,150 A | 3/1966 | Scoggin |
| 3,324,093 A | 6/1967 | Alleman |
| 3,374,211 A | 3/1968 | Marwil et al. |
| 3,405,109 A | 10/1968 | Rohlfing |
| 4,107,414 A | 8/1978 | Giannini et al. |
| 4,186,107 A | 1/1980 | Wagner |
| 4,226,963 A | 10/1980 | Giannini et al. |
| 4,347,160 A | 8/1982 | Epstein et al. |
| 4,382,019 A | 5/1983 | Greco |
| 4,435,550 A | 3/1984 | Ueno et al. |
| 4,465,782 A | 8/1984 | McKenzie |
| 4,472,524 A | 9/1984 | Albizzati |
| 4,473,660 A | 9/1984 | Albizzati et al. |
| 4,522,930 A | 6/1985 | Albizzati et al. |
| 4,532,311 A | 6/1985 | Filks et al. |
| 4,530,912 A | 7/1985 | Pullukat et al. |
| 4,532,313 A | 7/1985 | Matlack |
| 4,543,399 A | 9/1985 | Jenkins, III et al. |
| 4,560,671 A | 12/1985 | Gross et al. |
| 4,578,879 A | 4/1986 | Yokoyama et al. |
| 4,581,342 A | 4/1986 | Johnson et al. |
| 4,582,816 A | 4/1986 | Miro |
| 4,621,952 A | 11/1986 | Aronson |
| 4,657,882 A | 4/1987 | Karayannis et al. |
| 4,803,251 A | 2/1989 | Goode et al. |
| 4,855,370 A | 8/1989 | Chirillo et al. |
| 4,933,149 A | 6/1990 | Rhee et al. |
| 5,026,795 A | 6/1991 | Hogan |
| 5,391,654 A | 2/1995 | Ahvenainen et al. |
| 5,539,067 A | 7/1996 | Parodi et al. |
| 5,618,771 A | 4/1997 | Parodi et al. |

(Continued)

FOREIGN PATENT DOCUMENTS

| EP | 0 045 975 A2 | 2/1982 |
| EP | 0 045 976 A2 | 2/1982 |
| EP | 0 045 977 A2 | 2/1982 |
| EP | 0 047 077 A1 | 3/1982 |
| EP | 0 188 125 A2 | 7/1986 |
| EP | 0 250 169 A2 | 12/1987 |
| EP | 0 372 239 A2 | 6/1990 |
| EP | 0 479 186 A2 | 4/1992 |
| EP | 0 560 035 A1 | 9/1993 |
| EP | 0 579 426 A1 | 1/1994 |
| EP | 0 600 414 A1 | 6/1994 |
| EP | 0 683 176 A1 | 11/1995 |

(Continued)

OTHER PUBLICATIONS

Geldart et al.; The Design of Distributors for Gas-Fluidized Beds; Power Technology; vol. 42; 1985.

(Continued)

*Primary Examiner* — Catherine S Branch

(74) *Attorney, Agent, or Firm* — Fay Sharpe LLP

(57) ABSTRACT

A process for polymerizing propylene in the presence of a polymerization catalyst by polymerizing propylene with a comonomer selected from the group of ethylene and C4-C10 alpha-olefins in two polymerization stages where the comonomer is present in at least one of the polymerization stages. The first polymerization stage is conducted in a loop reactor and the second polymerization stage in a gas phase reactor. The polymer produced in first polymerization stage has a higher melt flow rate and a lower content of comonomer units than the final polymer mixture. The process can be operated with a high throughput and catalyst productivity. The polymers are useful for making films.

20 Claims, No Drawings

(56) References Cited

U.S. PATENT DOCUMENTS

| | | | |
|---|---|---|---|
| 2004/0096744 A1* | 5/2004 | Sadamitsu | B29C 55/005 429/254 |
| 2009/0048399 A1* | 2/2009 | Reijntjens | C08L 23/12 525/192 |

FOREIGN PATENT DOCUMENTS

| | | |
|---|---|---|
| EP | 0 684 871 A1 | 12/1995 |
| EP | 0 696 293 A1 | 2/1996 |
| EP | 0 699 213 A1 | 3/1996 |
| EP | 0 707 513 A1 | 4/1996 |
| EP | 0 721 798 A2 | 7/1996 |
| EP | 0 887 379 A1 | 12/1998 |
| EP | 0 887 380 A1 | 12/1998 |
| EP | 0 887 381 A1 | 12/1998 |
| EP | 0 891 990 A2 | 1/1999 |
| EP | 0 991 684 A1 | 4/2000 |
| EP | 1 310 295 A1 | 5/2003 |
| EP | 1 514 999 A1 | 5/2004 |
| EP | 1 591 460 A1 | 11/2005 |
| EP | 1 860 125 A1 | 11/2007 |
| GB | 1 272 778 | 5/1972 |
| GB | 1 580 635 | 12/1980 |
| WO | WO 87/07620 A1 | 12/1987 |
| WO | WO 92/19653 A1 | 11/1992 |
| WO | WO 92/19658 A1 | 11/1992 |
| WO | WO 92/19659 A1 | 11/1992 |
| WO | WO 92/21705 A1 | 12/1992 |
| WO | WO 93/11165 A1 | 6/1993 |
| WO | WO 93/11166 A1 | 6/1993 |
| WO | WO 93/19100 A1 | 9/1993 |
| WO | WO 94/25495 | 11/1994 |
| WO | WO 95/32994 A1 | 12/1995 |
| WO | WO 97/36939 A1 | 10/1997 |
| WO | WO 97/40080 A1 | 10/1997 |
| WO | WO 98/12234 A1 | 3/1998 |
| WO | WO 99/16797 A1 | 4/1999 |
| WO | WO 99/33842 A1 | 7/1999 |
| WO | WO 00/29452 | 5/2000 |
| WO | WO 02/088194 A1 | 11/2002 |
| WO | WO 03/000754 A1 | 1/2003 |
| WO | WO 03/000755 A2 | 1/2003 |
| WO | WO 03/000756 A1 | 1/2003 |
| WO | WO 03/000757 A1 | 1/2003 |
| WO | WO 2004/029112 A1 | 4/2004 |
| WO | WO 2005/087361 A1 | 9/2005 |
| WO | WO 2007/025640 A1 | 3/2007 |
| WO | WO 2007/137853 A1 | 12/2007 |
| WO | WO 2012/110351 A1 | 8/2012 |

OTHER PUBLICATIONS

Geldart et al.; Gas Fluidization Technology; J. Wiley & Sons; chapters 2.4-2.5; pp. 17-18; 1986.

Geldart et al.; Gas Fluidization Technology; J. Wiley & Sons; chapters 7.3-7.5; pp. 169-186; 1986.

* cited by examiner

TWO-STAGE PROCESS FOR PRODUCING POLYPROPYLENE COMPOSITIONS

FIELD OF THE INVENTION

The present invention is directed to a method of producing propylene polymers. Especially, the present method is directed to a method of producing propylene copolymers having a broadened molecular weight distribution. In particular, the present method is directed to a method of polymerizing propylene with comonomers in two stages. The resulting polymers are well suited for producing films.

Problem to be Solved

It is known in the art to polymerize propylene in two or more stages to produce resins, for instance, from WO-A-1997040080 and EP-A-887380. Such methods often produce a high molecular weight polymer in a first polymerization stage and a low molecular weight polymer in a subsequent polymerization step.

Such methods have a disadvantage in that for most polymerization catalysts the activity of the catalyst is reduced when the polymerization is conducted at a low hydrogen concentration. It may then be necessary to operate the reactors at a lower production rate than would otherwise be possible in order to reach a desired content of the high molecular weight component in the polymer. This leads to an economical loss.

Also, when the polymer containing the active catalyst is transferred into the second polymerization stage where hydrogen is present in high concentration the activity of the catalyst increases. It may then be necessary to take steps of reducing the activity, such as by feeding activity retarders into the second polymerization stage.

It is also known to produce the low molecular weight polymer in first polymerization step and the high molecular weight polymer in the subsequent polymerization step. Such process is disclosed in examples 4 and 13 of WO-A-1997040080. The disadvantage of such process is that it requires a hydrogen removal step, such as flashing step, between the first and the second polymerization stages. Otherwise it may be not possible to reach the desired properties of the final polymer.

It is further known to operate the above-mentioned process without a flashing step, as was done in examples 2 and 3 of WO-A-1999016797. In those examples the portion of the polymer produced in the loop reactor was at least 70%.

The objective of the present invention is thus to overcome the problems of prior art processes and to provide a process which allows the production of propylene copolymer compositions suitable for making films. Especially, the objective is to provide a process having improved production economy which allows the production of polypropylene compositions suitable for producing oriented films and in particular biaxially oriented films.

The process according to the invention has an increased throughput and/or an improved productivity of the catalyst compared to the prior art processes. Furthermore, the process allows improved and stable control of polymer properties. It furthermore avoids the problem of too high activity of the catalyst in later polymerization stages thus avoiding the use of activity retarders.

SUMMARY OF THE INVENTION

As seen from one aspect, the present invention provides a process for polymerizing propylene in the presence of a polymerization catalyst comprising (I) a solid catalyst component comprising magnesium and titanium compounds, and an internal electron donor; and (II) a cocatalyst comprising an aluminium alkyl and optionally an external electron donor, said process comprising the steps of:

(A) continuously polymerizing propylene by introducing streams of propylene, hydrogen and said polymerization catalyst into a loop reactor at a temperature of from 65 to 100° C. and a pressure of from 25 to 100 bar to produce slurry of particles of a first homopolymer of propylene having a melt flow rate $MFR_2$ of from 3 to 20 g/10 min in a first reaction mixture;

(B) withdrawing a slurry stream from said loop reactor, said slurry stream comprising said first reaction mixture and said particles of the first homopolymer of propylene, said particles further comprising said polymerization catalyst, and passing the slurry stream into a gas phase reactor;

(C) continuously copolymerizing propylene by introducing streams of propylene, a comonomer selected from the group of ethylene and C4-C10 alpha-olefins and optionally hydrogen into said gas phase reactor at a temperature of from 65 to 100° C. and a pressure of from 10 to 40 bar to produce particles comprising a polymer mixture of said first homopolymer of propylene and a second copolymer of propylene, said polymer mixture having a content of comonomer units from 0.1 to 5 mol-% and a melt flow rate $MFR_2$ of from 1 to 10 g/10 min; wherein said polymer mixture comprises from 35 to 65% by weight of said homopolymer and from 65 to 35% by weight of said copolymer, and wherein the melt flow rate $MFR_2$ of said polymer mixture is lower than the melt flow rate $MFR_2$ of said homopolymer;

(D) withdrawing a stream comprising said polymer mixture from said gas phase reactor;

(E) removing hydrocarbons from said stream withdrawn from said gas phase reactor to produce a polymer stream with a reduced content of hydrocarbons and optionally introducing additives to the polymer mixture;

(F) extruding said polymer mixture into pellets.

As seen from another aspect the present invention provides a process for producing a film comprising the steps of:

(1) producing a propylene polymer composition as defined above;

(2) extruding said propylene polymer composition into a film.

DETAILED DESCRIPTION

Even though the present invention relates to a two stage process for producing polypropylene compositions it should be understood that the process may contain additional polymerization stages to the two stages disclosed above. It may contain additional polymerization stages, such as a prepolymerization stage, as long as the polymer produced in such additional stages does not substantially influence the properties of the polymer. Furthermore, either one or both of the two polymerization stages disclosed above may be conducted as two or more sub-stages, provided that the polymer produced in each such sub-stage as well as their mixture matches the description for the polymer for the respective stage. However, it is preferred to conduct each of the first and the second polymerization stage as a single polymerization stage in order to prevent the process from becoming unnecessarily complex. Therefore, in the most preferred embodiment the polymerization process consists of two polymerization stages which may be preceded a prepolymerization stage.

The present invention is directed to producing copolymers of propylene and a comonomer selected from the group consisting of ethylene and alpha-olefins having from 4 to 10 carbon atoms. Preferably the comonomer is selected from the group of ethylene and alpha-olefins having from 4 to 8 carbon atoms. Especially preferably the comonomer is ethylene.

Catalyst

A Ziegler-Natta type catalyst typically used in the present invention for propylene polymerization is stereospecific, high yield Ziegler-Natta catalyst comprising as essential components Mg, Ti and Cl. In addition to the solid catalyst a cocatalyst as well as an external donor is typically used in a polymerization process.

The magnesium and titanium compounds may be supported on a particulate support, such as inorganic oxide, like silica or alumina, or, usually, the magnesium halide forms the solid support. It is also possible that solid catalysts are self supported, i.e. the catalysts are not supported on an external support, but are prepared via an emulsion-solidification method or by a precipitation method.

Especially useful solid catalysts are those disclosed in WO-A-2003/000757, WO-A-2003/000754, WO-A-2004/029112 and WO2007/137853. These catalysts are solid catalysts of spherical particles with compact structure and low surface area of the particles. Further, these catalysts are featured by a uniform distribution of catalytically active sites thorough the catalyst particles. Catalysts are prepared by emulsion-solidification method, where no external support is needed. The dispersed phase in the form of liquid droplets of the emulsion forms the catalyst part, which is transformed to solid catalyst particles during the solidification step.

Thus, in an especially preferred embodiment of the present invention, the solid catalyst component is prepared by a process comprising:

preparing a solution of magnesium complex by reacting an alkoxy magnesium compound and an electron donor or a precursor thereof in a $C_6$-$C_{10}$ aromatic liquid reaction medium;

reacting said magnesium complex with a fourvalent titanium compound, preferably $TiCl_4$, at a temperature greater than 10° C. and less than 50° C. to produce an emulsion of a denser, dispersed phase having Ti/Mg mol ratio 0.1 to 10 in a continuous phase having Ti/Mg mol ratio 10 to 100; and agitating the emulsion, optionally in the presence of an emulsion stabilizer and/or a turbulence minimizing agent, in order to maintain the droplets of said dispersed phase within an average size range of 5 to 200 μm.

In the above-mentioned process the catalyst particles are obtained after solidifying said droplets of the dispersed phase by heating, preferably at a temperature from 80° C. to 110° C. In said process an aluminium alkyl compound of the formula $AlR_{3-n}X_n$, where R is an alkyl and/or an alkoxy group of 1 to 20, preferably of 1 to 10 carbon atoms, X is a halogen and n is 0, 1 or 2, is added and brought into contact with the droplets of the dispersed phase of the agitated emulsion. Alternatively, the aluminium alkyl compound of the formula $AlR_{3-n}X_n$ is brought into contact with the solidified particles at the washing step before recovering the final solid particles.

The solid transition metal component usually also comprises an electron donor (internal electron donor). Suitable internal electron donors are, among others, esters of carboxylic acids, like phthalates, citraconates, and succinates. Also oxygen- or nitrogen-containing silicon compounds may be used. A class of compounds which is suitable to be used as an internal donor in the above-described catalyst manufacturing method is aromatic carboxylic acid esters or diesters. They can be formed in situ by reaction of an aromatic carboxylic acid chloride or diacid chloride with a $C_2$-$C_{16}$ alkanol and/or diol. An especially preferred compound to be used as an internal donor is di-2-ethyl-hexyl phthalate.

The cocatalyst used in combination with the transition metal compound typically comprises an aluminium alkyl compound. The aluminium alkyl compound is preferably trialkyl aluminium such as trimethylaluminium, triethylaluminium, tri-isobutyl aluminium or tri-n-octylaluminium. However, it may also be an alkyl aluminium halide, such as diethyl aluminium chloride, dimethylaluminium chloride and ethylaluminium sesquichloride. The cocatalyst may also be a mixture of two or more of the above-mentioned compounds. Triethylaluminium is an especially preferred aluminium alkyl compound to be used as a cocatalyst. The aluminium alkyl is preferably introduced to reach a desired ratio of the aluminium to titanium. Suitable ratios depend on the catalyst and lie within the range of from 30 to 1000 mol/mol, such as 50 to 800 mol/mol.

Preferably the catalyst also comprises an external electron donor. Suitable electron donors known in the art include ethers, ketones, amines, alcohols, phenols, phosphines and silanes. Silane type external donors are typically organosilane compounds containing Si—OCOR, Si—OR, or Si—$NR_2$ bonds, having silicon as the central atom, and R is an alkyl, alkenyl, aryl, arylalkyl or cycloalkyl with 1-20 carbon atoms are known in the art. The electron donor may also be a mixture of two or more of the above-mentioned compounds. Organosilane compounds are preferred external donors, with dicyclopentyldimethoxysilane and cyclohexylmethyldimethoxysilane being especially preferred. The organosilane compound is typically introduced to keep a desired molar ratio between aluminium alkyl and the silane compound, such as Al/Donor from 3 to 800 mol/mol or from 10 to 200 mol/mol.

Examples of suitable catalysts and compounds in catalysts are shown in among others, in WO-A-87/07620, WO-A-92/21705, WO-A-93/11165, WO-A-93/11166, WO-A-93/19100, WO-A-97/36939, WO-A-98/12234, WO-A-99/33842, WO-A-03/000756, WO-A-03/000757, WO-A-03/000754, WO-A-03/000755, WO-A-2004/029112, WO-A-92/19659, WO-A-92/19653, WO-A-92/19658, U.S. Pat. No. 4,382,019, U.S. Pat. No. 4,435,550, U.S. Pat. No. 4,465,782, U.S. Pat. No. 4,473,660, U.S. Pat. No. 4,560,671, U.S. Pat. No. 5,539,067, U.S. Pat. No. 5,618,771, EP-A-45975, EP-A-45976, EP-A-45977, WO-A-95/32994, U.S. Pat. No. 4,107,414, U.S. Pat. No. 4,186,107, U.S. Pat. No. 4,226,963, U.S. Pat. No. 4,347,160, U.S. Pat. No. 4,472,524, U.S. Pat. No. 4,522,930, U.S. Pat. No. 4,530,912, U.S. Pat. No. 4,532,313, U.S. Pat. No. 4,657,882, U.S. Pat. No. 4,581,342 and U.S. Pat. No. 4,657,882.

Prepolymerization

In a preferred embodiment the first polymerization stage is preceded by a prepolymerization stage. The prepolymerization is conducted in a continuous manner as bulk slurry polymerization in liquid propylene, i.e. the liquid phase mainly comprises propylene, with minor amount of other reactants and optionally inert components dissolved therein. Preferably the prepolymerization is conducted in a continuous stirred tank reactor or a loop reactor.

The prepolymerization reaction is typically conducted at a temperature of 0 to 60° C., preferably from 10 to 50° C.

The pressure in the prepolymerization reactor is not critical but must be sufficiently high to maintain the reaction mixture in liquid phase. Thus, the pressure may be from 20 to 100 bar, for example 30 to 70 bar.

The reaction conditions are well known in the art as disclosed, among others, in GB-A-1580635.

It is also possible to feed comonomers into the prepolymerization stage. Examples of suitable comonomers are ethylene or alpha-olefins having from 4 to 10 carbon atoms. Especially suitable comonomers are ethylene, 1-butene, 1-hexene, 1-octene or their mixtures.

First Polymerization Stage

In a first polymerization stage a first homopolymer of propylene is produced. This is done by introducing a polymerization catalyst, optionally through the prepolymerization stage as disclosed above, into the first polymerization stage together with propylene.

The first homopolymer produced in the first polymerization stage has a melt index $MFR_2$ of from 3 to 20 g/10 min. Preferably the melt index $MFR_2$ of the first homopolymer is from 4 to 15 g/10 min and more preferably from 5 to 10 g/10 min. It is important that the melt index of the first homopolymer remains within these limits. If the melt index is higher, then a high amount of hydrogen would be needed to reach the melt index and a separation step to remove hydrogen would be needed. Otherwise it would not be possible to reach the desired melt index in the second polymerization stage. On the other hand, a too low melt index of the first homopolymer would lead to an insufficiently narrow molecular weight distribution and thus to unacceptable polymer properties.

The polymerization in the first polymerization zone is conducted in slurry in a loop reactor. For this reason the terms "first polymerization stage" and "loop reactor" may be used interchangeably within the context of the present invention. Then the polymer particles formed in the polymerization, together with the catalyst fragmented and dispersed within the particles, are suspended in the fluid hydrocarbon. The slurry is agitated to enable the transfer of reactants from the fluid into the particles. In loop reactors the slurry is circulated with a high velocity along a closed pipe by using a circulation pump. Loop reactors are well known in the art and examples are given, for instance, in U.S. Pat. No. 4,582,816, U.S. Pat. No. 3,405,109, U.S. Pat. No. 3,324,093, EP-A-479186 and U.S. Pat. No. 5,391,654.

Slurry polymerization is preferably a so called bulk polymerization. By "bulk polymerization" is meant a process where the polymerization is conducted in a liquid monomer essentially in the absence of an inert diluent. However, as it is known to a person skilled in the art the monomers used in commercial production are never pure but always contain aliphatic hydrocarbons as impurities. For instance, the propylene monomer may contain up to 5% of propane as an impurity. As propylene is consumed in the reaction and also recycled from the reaction effluent back to the polymerization, the inert components tend to accumulate, and thus the reaction medium may comprise up to 40% by weight of other compounds than monomer. It is to be understood, however, that such a polymerization process is still within the meaning of "bulk polymerization", as defined above.

The temperature in the slurry polymerization is typically from 65 to 100° C., preferably from 70 to 95° C. and in particular from 70 to 90° C. The pressure is from 25 to 100 bar, preferably from 30 to 80 bar.

The slurry may be withdrawn from the reactor either continuously or intermittently. A preferred way of intermittent withdrawal is the use of settling legs where the solids concentration of the slurry is allowed to increase before withdrawing a batch of the concentrated slurry from the reactor. The use of settling legs is disclosed, among others, in U.S. Pat. No. 3,374,211, U.S. Pat. No. 3,242,150 and EP-A-1310295. Preferably the slurry is withdrawn from the reactor continuously. Continuous withdrawal is disclosed, among others, in EP-A-891990, EP-A-1415999, EP-A-1591460 and EP-A-1860125. The continuous withdrawal may be combined with a suitable concentration method, as disclosed in EP-A-1860125 and EP-A-1591460.

Into the slurry polymerization stage other components are also introduced as it is known in the art. Thus, hydrogen is used to control the molecular weight of the polymer. Process additives, such as antistatic agent, may be introduced into the reactor to facilitate a stable operation of the process.

Hydrogen feed is typically adjusted to maintain a constant ratio of hydrogen to propylene within the loop reactor. The ratio is maintained such that the melt index $MFR_2$ of the first homo- or copolymer is at the desired value. While the actual value of the required hydrogen to propylene ratio depends, among others, on the catalyst and polymerization conditions it has been found that when the ratio is within the range of from 0.15 to 5.0 mol/kmol (or, mol/1000 mol), preferably from 0.2 to 3.0 mol/kmol, good results have been obtained.

According to the present invention the slurry stream withdrawn from the loop reactor is passed into the gas phase reactor. The stream is thus conducted directly into the gas phase polymerization stage. By "directly" it is meant that the slurry is introduced from the loop reactor into the gas phase reactor without a flash step between the slurry and gas phase polymerization stages for removing at least a part of the reaction mixture from the polymer. Thereby, substantially the entire slurry stream withdrawn from the first polymerization stage is passed to the second polymerization stage. This kind of direct feed is described in EP-A-887379, EP-A-887380, EP-A-887381 and EP-A-991684. However, it is within the scope of the present invention to take small samples or sample streams from the polymer or from the fluid phase or from both for analyzing the polymer and/or the composition of the reaction mixture. As understood by the person skilled in the art, the volume of such sample streams is small compared to the total slurry stream withdrawn from the loop reactor and typically much lower than 1% by weight of the total stream, such as at most 0.1% or 0.01% or even 0.001% by weight.

Second Polymerization Stage

In the second polymerization stage a polymer mixture comprising the first homopolymer and a second copolymer is formed. This is done by introducing the particles of the first homopolymer, containing active catalyst dispersed therein, together with additional propylene and comonomer into the second polymerization stage. This causes the second copolymer to form on the particles containing the first homopolymer. The second polymerization stage is conducted in a fluidized bed gas phase reactor. For this reason the terms "second polymerization stage" and "gas phase reactor" may be used interchangeably within the context of the present invention.

The comonomer is selected from ethylene and alpha-olefins containing 4 to 10 carbon atoms and the mixtures thereof. Preferably the comonomer is ethylene.

The content of the comonomer in the second polymerization stage is controlled to obtain the desired comonomer content of the polymer mixture. Typically the polymer mixture contains from 0.1 to 5% by mole of units derived from the comonomer and from 95 to 99.9% by mole of propylene units. Preferably the polymer mixture contains from 0.1 to 2% by mole of units derived from the comonomer and from 98 to 99.9% by mole of propylene units.

The second copolymer produced in the second polymerization stage is semicrystalline and not amorphous. Therefore it has a substantial fraction which is not soluble in xylene at 25° C. The polymer mixture preferably has a content of xylene soluble fraction of from 0.5 to 10% by weight, preferably from 2 to 8% by weight.

The melt index MFR$_2$ of the polymer mixture is from 1 to 10 g/10 min. Preferably the melt index MFR$_2$ of the polymer mixture is from 1 to 7 g/10 min, more preferably from 2 to 5 g/10 min. Furthermore, the melt index of the polymer mixture is lower than the melt index of the first homopolymer. Preferably, the ratio of the melt index of the polymer mixture to the melt index of the first homopolymer, MFR$_{2,b}$/MFR$_{2,1}$, has a value of not higher than 0.8, more preferably not higher than 0.6 and in particular not higher than 0.5. Typically, the ratio MFR$_{2,b}$/MFR$_{2,1}$ has a value of at least 0.1, preferably at least 0.2

As it is well known in the art the melt index MFR$_2$ of the second copolymer produced in the second polymerization stage cannot be directly measured because the second copolymer cannot be isolated from the polymer mixture. However, by knowing the weight fractions of the first homopolymer and the second copolymer in the polymer mixture and the melt indices of the first homopolymer and the polymer mixture it is possible to calculate the MFR$_2$ of the second copolymer. This can be done by using the equation $$MI_b = (w_1 \cdot MI_1^{-0.0965} + w_2 \cdot MI_2^{-0.0965})^{-\frac{1}{0.0965}} \quad \text{(eq. 1)}$$

where w is the weight fraction of the component in the mixture, MI is the melt index MFR$_2$ and subscripts b, 1 and 2 refer to the mixture, component 1 and component 2, respectively. By calculating the MFR$_2$ of the second copolymer it can be found to lie within the range of from 0.5 to 3 g/10 min, preferably 0.5 to 2 g/10 min.

The comonomer content of the second copolymer cannot be directly measured, either. However, by using the standard mixing rule it can be calculated from the comonomer content of the polymer mixture.

$$C_b = w_1 \cdot C_1 + w_2 \cdot C_2 \quad \text{(eq. 2)}$$

where C is the content of comonomer in weight-%, w is the weight fraction of the component in the mixture and subscripts b, 1 and 2 refer to the overall mixture, component 1 and component 2, respectively. Hereby it is observed that the first homopolymer has a comonomer content of 0. The second copolymer can then be found to contain preferably from 0.2 to 8% by mole of units derived from the comonomer and from 92 to 99.8% by mole of propylene units. More preferably, the second copolymer contains from 0.2 to 4% by mole of units derived from the comonomer and from 96 to 99.8% by mole of propylene units. Especially preferably the second copolymer contains from 0.3 to 1.0% by mole of units derived from the comonomer and from 99.0 to 99.7% by mole of propylene units.

As it is well known to the person skilled in the art the comonomer content in weight basis of a binary copolymer can be converted to the comonomer content in mole basis by using the following equation $$c_m = \frac{1}{1 + \left(\frac{1}{c_w} - 1\right) \cdot \frac{MW_c}{MW_m}} \quad \text{(eq. 3)}$$

where $c_m$ is the mole fraction of comonomer units in the copolymer, $c_w$ is the weight fraction of comonomer units in the copolymer, MW$_c$ is the molecular weight of the comonomer (such as ethylene) and MW$_m$, is the molecular weight of the main monomer (i.e., propylene).

The content of the xylene soluble polymer in the second copolymer cannot be directly measured. The content can be estimated, however, by using the standard mixing rule:

$$XS_b = w_1 \cdot XS_1 + w_2 \cdot XS_2 \quad \text{(eq. 4)}$$

where XS is the content of xylene soluble polymer in weight-%, w is the weight fraction of the component in the mixture and subscripts b, 1 and 2 refer to the overall mixture, component 1 and component 2, respectively. The second copolymer typically can be found to have a content of xylene soluble polymer of not higher than 10% by weight, preferably not higher than 8% by weight. Typically the fraction of xylene soluble polymer in the copolymer is at least 1% by weight.

The polymer mixture preferably comprises from 35 to 65% by weight, preferably 40 to 60% by weight of the first homopolymer and from 35 to 65% by weight, preferably 40 to 60% by weight of the second copolymer.

When the entire slurry stream from the first polymerization stage is introduced into the second polymerization stage then substantial amounts of propylene and hydrogen are introduced into the second polymerization stage together with the polymer. However, this is generally not sufficient for maintaining the desired concentration of propylene in the second polymerization stage. Therefore additional propylene is typically introduced into the second polymerization stage.

Additionally comonomer is introduced to reach a desired ratio of comonomer to propylene in the fluidization gas. Even though the actual comonomer to monomer ratio that is needed to reach the desired content of comonomer in the polymer depends, among others, on the catalyst used in the process, the monomer and comonomer feeds are suitably adjusted so that the fluidization gas has a ratio of ethylene to propylene of about 1 to 10 mol/kmol (or, mol/1000 mol), preferably from 1 to 5 mol/kmol. Such ratios have been found to yield good results for some catalysts.

It may also be necessary to introduce additional hydrogen into the second polymerization stage for controlling the melt index of the polymer mixture. Suitably, the hydrogen feed is controlled to maintain a constant ratio of hydrogen to propylene in the fluidization gas. The actual ratio depends on the catalyst. Good results have been obtained by maintaining the ratio within the range of from 0.2 to 10 mol/kmol, preferably from 0.5 to 5 mol/kmol.

In a fluidized bed gas phase reactor olefins are polymerized in the presence of a polymerization catalyst in an upwards moving gas stream. The reactor typically contains a fluidized bed comprising the growing polymer particles containing the active catalyst, said fluidized bed having its base above a fluidization grid.

The polymer bed is fluidized with the help of the fluidization gas comprising the olefin monomer, eventual comonomer(s), eventual chain growth controllers or chain transfer agents, such as hydrogen, and eventual inert gas. The fluidization gas is introduced into an inlet chamber at the bottom of the reactor. To make sure that the gas flow is uniformly distributed over the cross-sectional surface area of the inlet chamber the inlet pipe may be equipped with a flow dividing element as known in the art, e.g. U.S. Pat. No. 4,933,149 and EP-A-684871. One or more of the above-mentioned components may be continuously added into the fluidization gas to compensate for losses caused, among other, by reaction or product withdrawal.

From the inlet chamber the gas flow is passed upwards through a fluidization grid into the fluidized bed. The purpose of the fluidization grid is to divide the gas flow evenly through the cross-sectional area of the bed. Sometimes the fluidization grid may be arranged to establish a gas stream to sweep along the reactor walls, as disclosed in WO-A-2005/087361. Other types of fluidization grids are disclosed, among others, in U.S. Pat. No. 4,578,879, EP 600414 and EP-A-721798. An overview is given in Geldart and Bayens: The Design of Distributors for Gas-fluidized Beds, Powder Technology, Vol. 42, 1985.

The fluidization gas passes through the fluidized bed. The superficial velocity of the fluidization gas must be higher that minimum fluidization velocity of the particles contained in the fluidized bed, as otherwise no fluidization would occur. On the other hand, the velocity of the gas should be lower than the transport velocity, as otherwise the whole bed would be entrained with the fluidization gas. The bed voidage then is then typically less than 0.8, preferably less than 0.75 and more preferably less than 0.7. Generally the bed voidage is at least 0.6. An overview is given, among others in Geldart: Gas Fluidization Technology, J. Wiley & Sons, 1986 in chapters 2.4 and 2.5 (pages 17-18) as well as in chapters 7.3 to 7.5 (pages 169-186, especially FIG. 7.21 on page 183).

When the fluidization gas is contacted with the bed containing the active catalyst the reactive components of the gas, such as monomers and chain transfer agents, react in the presence of the catalyst to produce the polymer product. At the same time the gas is heated by the reaction heat.

The unreacted fluidization gas is removed from the top of the reactor and cooled in a heat exchanger to remove the heat of reaction. The gas is cooled to a temperature which is lower than that of the bed to prevent the bed from heating because of the reaction. It is possible to cool the gas to a temperature where a part of it condenses. When the liquid droplets enter the reaction zone they are vaporised. The vaporisation heat then contributes to the removal of the reaction heat. This kind of operation is called condensed mode and variations of it are disclosed, among others, in WO-A-2007/025640, U.S. Pat. No. 4,543,399, EP-A-699213 and WO-A-94/25495. It is also possible to add condensing agents into the recycle gas stream, as disclosed in EP-A-696293. The condensing agents are non-polymerizable components, such as n-pentane, isopentane, n-butane or isobutane, which are at least partially condensed in the cooler.

The gas is then compressed and recycled into the inlet chamber of the reactor. Prior to the entry into the reactor fresh reactants are introduced into the fluidization gas stream to compensate for the losses caused by the reaction and product withdrawal. It is generally known to analyze the composition of the fluidization gas and introduce the gas components to keep the composition constant. The actual composition is determined by the desired properties of the product and the catalyst used in the polymerization.

The polymeric product may be withdrawn from the gas phase reactor either continuously or intermittently. Combinations of these methods may also be used. Continuous withdrawal is disclosed, among others, in WO-A-00/29452. Intermittent withdrawal is disclosed, among others, in U.S. Pat. No. 4,621,952, EP-A-188125, EP-A-250169 and EP-A-579426.

The top part of the gas phase reactor may include a so called disengagement zone. In such a zone the diameter of the reactor is increased to reduce the gas velocity and allow the particles that are carried from the bed with the fluidization gas to settle back to the bed.

The bed level may be observed by different techniques known in the art. For instance, the pressure difference between the bottom of the reactor and a specific height of the bed may be recorded over the whole length of the reactor and the bed level may be calculated based on the pressure difference values. Such a calculation yields a time-averaged level. It is also possible to use ultrasonic sensors or radioactive sensors. With these methods instantaneous levels may be obtained, which of course may then be averaged over time to obtain a time-averaged bed level.

Also antistatic agent(s) may be introduced into the gas phase reactor if needed. Suitable antistatic agents and methods to use them are disclosed, among others, in U.S. Pat. No. 5,026,795, U.S. Pat. No. 4,803,251, U.S. Pat. No. 4,532,311, U.S. Pat. No. 4,855,370 and EP-A-560035. They are usually polar compounds and include, among others, water, ketones, aldehydes and alcohols.

The reactor may also include a mechanical agitator to further facilitate mixing within the fluidized bed. An example of suitable agitator design is given in EP-A-707513.

Typically the fluidized bed polymerization reactor is operated at a temperature within the range of from 50 to 100° C., preferably from 65 to 90° C. The pressure is suitably from 10 to 40 bar, preferably from 15 to 30 bar.

Post Reactor Treatment

When the polymer mixture has been removed from the polymerization reactor it is subjected to process steps for removing residual hydrocarbons from the polymer. Such processes are well known in the art and can include pressure reduction steps, purging steps, stripping steps, extraction steps and so on. Also combinations of different steps are possible.

According to one preferred process a part of the hydrocarbons is removed from the polymer powder by reducing the pressure. The powder is then contacted with steam at a temperature of from 90 to 110° C. for a period of from 10 minutes to 3 hours. Thereafter the powder is purged with inert gas, such as nitrogen, over a period of from 1 to 60 minutes at a temperature of from 20 to 80° C.

According to another preferred process the polymer powder is subjected to a pressure reduction as described above. Thereafter it is purged with an inert gas, such as nitrogen, over a period of from 20 minutes to 5 hours at a temperature of from 50 to 90° C.

The purging steps are preferably conducted continuously in a settled moving bed. The polymer moves downwards as a plug flow and the purge gas, which is introduced to the bottom of the bed, flows upwards.

Suitable processes for removing hydrocarbons from polymer are disclosed in WO-A-02/088194, EP-A-683176, EP-A-372239, EP-A-47077 and GB-A-1272778.

After the removal of residual hydrocarbons the polymer mixture is preferably mixed with additives as it is well known in the art. Such additives include antioxidants, process stabilizers, neutralizers, lubricating agents, nucleating agents, pigments and so on.

The polymer mixture is then extruded to pellets as it is known in the art. Preferably a co-rotating twin screw extruder is used for the extrusion step. Such extruders are manufactured, for instance, by Coperion and Japan Steel Works.

Films are produced according to the methods known in the art from the polymer mixture which has been extruded to pellets as disclosed above. Thus, according to one preferred method the polymer composition is extruded through a flat die to a desired width, after which the film is cooled.

In one suitable process the polymer melt is extruded through a flat die. The melt is then extruded to a chill roll where it is cooled. The chill roll is typically cooled to a temperature of about 20° C. The film is then passed through a series of rolls for different objectives and collected. Film extrusion processes are well known in the art and descriptions can be found in the literature, among others Raff and Doak, Crystalline Olefin Polymers, Part II (John Wiley & Sons, 1964), pages 443 to 461 and Vieweg, Schley and Schwarz, Polyolefine (Carl Hanser Verlag, Munchen, 1969), pages 401 to 428.

After the extrusion the films are preferably oriented, more preferably oriented in two directions. This can be done by stretching the film successively in two directions, in the machine direction and in the transverse direction. For example, a stretching ratio of from 3:1 to 6:1 in the machine direction and from 5:1 to 15:1 in the transverse direction has been found to produce films with good properties. Biaxially oriented films are well-known and are disclosed, among others, in the above-mentioned book of Vieweg, Schley and Schwarz on pages 420 to 426 and in U.S. Pat. No. 3,223,764, where the orientation process is discussed from col. 5, line 19 to col. 7, line 33.

Benefits of the Invention

As it has been described above, the process of the present invention is capable of producing high-quality polypropylene film materials efficiently and economically. It can be operated without difficulty and with balanced activity of the catalyst in both reactors.

Especially, the present inventors have found that the in process of the invention the loop reactor can be operated in a stable fashion and the melt index of the polymer produced therein can be accurately controlled. In the prior art process, where the high molecular weight copolymer was produced in the loop reactor the hydrogen concentration was very low and small variations in the hydrogen flow could significantly disturb the MFR of the polymer. Such disturbance consequently moved to the subsequent process steps and could result in quality variations in the product. With the present process the control of the melt index of the polymer is more accurate in both polymerization stages and especially in the loop reactor. Therefore a product with a more even quality is obtained.

The inventors have also found that the process of the present invention makes it convenient to produce a polymer composition comprising two components having different molecular weights and contents of comonomer units where the components have substantially the same fraction of xylene soluble polymer. Such a polymer is advantageous in certain applications.

The inventors have also found that when the polymer components produced in each reactor are designed as defined above then the desired polymer properties can be reached even though no hydrogen removal between the loop and the gas phase reactors takes place. Surprisingly, the hydrogen passed from the first polymerization stage to the second polymerization stage does not disturb the polymerization in the second polymerization stage. The polymer properties are not compromised even though hydrogen is carried over from the first to the second polymerization stage.

Description of Methods

Melt Flow Rate

Melt flow rate (MFR, $MFR_2$) was determined according to ISO 1133 at 230° C. under the load of 2.16 kg.

The melt flow rate $MFR_2$ is herein assumed to follow the following mixing rule (equation 1):

$$MI_b = (w_1 \cdot MI_1^{-0.0965} + w_2 \cdot MI_2^{-0.0965})^{-\frac{1}{0.0965}} \quad \text{(eq. 1)}$$

Where w is the weight fraction of the component in the mixture, MI is the melt index $MFR_2$ and subscripts b, 1 and 2 refer to the mixture, component 1 and component 2, respectively.

Content of Comonomer

Ethylene content, i.e., the content of ethylene units in propylene polymer was measured by Fourier transmission infrared spectroscopy (FTIR). A thin film of the sample (thickness approximately 250 μm) was prepared by hot-pressing. The area of —CH2- absorption peak (800-650 $cm^{-1}$) was measured with Perkin Elmer FTIR 1600-spectrometer. The method was calibrated by ethylene content data measured by $^{13}C$ NMR.

The comonomer content is herein assumed to follow the mixing rule (equation 2):

$$C_b = w_1 \cdot C_1 + w_2 \cdot C_2 \quad \text{(eq. 2)}$$

where C is the content of comonomer in weight-%, w is the weight fraction of the component in the mixture and subscripts b, 1 and 2 refer to the overall mixture, component 1 and component 2, respectively.

Xylene Soluble

The amount of xylene soluble fraction was determined according to ISO 16152. The amount of polymer which remains dissolved at 25° C. after cooling is given as the amount of xylene soluble polymer.

The content of xylene soluble polymer is herein assumed to follow the mixing rule (equation 4):

$$XS_b = w_1 \cdot XS_1 + w_2 \cdot XS_2 \quad \text{(eq. 4)}$$

Where XS is the content of xylene soluble polymer in weight-%, w is the weight fraction of the component in the mixture and subscripts b, 1 and 2 refer to the overall mixture, component 1 and component 2, respectively.

EXAMPLES

Catalyst Preparation

The solid catalyst component was prepared otherwise according to Example 8 of WO 2004/029112, except that diethylaluminium chloride was used as an aluminium compound instead of triethylaluminium.

Example

A stirred tank reactor having a volume of 40 $dm^3$ was operated as liquid-filled at a temperature of 28° C. and a pressure of 54 bar. Into the reactor was fed propylene (70 kg/h) so much that the average residence time in the reactor was 0.3 hours and hydrogen so that the feed ratio of hydrogen to propylene was 0.1 mol/kmol and 2.6 g/h of a polymerization catalyst prepared according to Catalyst Preparation Example above with triethyl aluminium (TEA) as a cocatalyst and dicyclopentyldimethoxysilane (DCP-DMS) as external donor so that the molar ratio of TEA/Ti was about 130 mol/mol and TEA/DCPDMS was 130 mol/mol.

The slurry from this prepolymerization reactor was directed to a loop reactor having a volume of 150 dm³ together with 145 kg/h of propylene and hydrogen so that the molar ratio of hydrogen to propylene was 0.64 mol/kmol. The loop reactor was operated at a temperature of 80° C. and a pressure of 54 bar. The production rate of propylene homopolymer was 25 kg/h, and the melt flow rate MFR$_2$ was 6.6 g/10 min.

The polymer slurry from the loop reactor was directly conducted into a gas phase reactor operated at a temperature of 75° C. and a pressure of 19 bar. Into the reactor were fed additional propylene, ethylene and hydrogen so that the propylene concentration was 94 mol-%, the ratio of ethylene to propylene was 2.5 mol/kmol and the ratio of hydrogen to propylene was 1.8 mol/kmol. The production rate in the reactor was 22 kg/h and the polymer withdrawn from the reactor had a melt flow rate MFR$_2$ of 3.0 g/10 min and an ethylene content of 0.2% by weight. The split of the polymer produced in the loop reactor to the polymer produced in the gas phase reactor was 53:47.

The polymer was withdrawn from the reactor and mixed with effective amounts of Irgafos 168, Irganox 1010 and calcium stearate. The mixture of polymer and additives was then extruded to pellets by using a ZSK70 extruder (product of Coperion) under nitrogen atmosphere. The melt temperature was about 230° C. and SEI was about 200 kWh/ton.

Comparative Example

The procedure of Example 1 was repeated except that the process was operated with conditions shown in Table 2 and that the molar ratio TEA/Ti was 95 mol/mol and TEA/DCPDMS was 51 mol/mol.

The example and the comparative example thus show that the method of the present invention yields film resins having similar properties to the reference prior art resins but the present process gives about 30% higher productivity for the catalyst. Furthermore, in the resin of the Example the fractions of the xylene soluble polymer in the polymer components produced in the two reactors are relatively close to each other. On the other hand, in the resin of the Comparative Example the polymer produced in the loop reactor has a significantly greater fraction of xylene soluble polymer than the polymer produced in the gas phase reactor.

TABLE 1

Polymerization data of the Example and the Comparative Example

| Example | Example | Comparative Example |
|---|---|---|
| Prepol Temperature, ° C. | 28 | 28 |
| Loop Temperature, ° C. | 80 | 80 |
| Loop H2/C3 mol/kmol | 0.64 | 0.25 |
| Loop C2/C3 mol/kmol | 0 | 1.6 |
| Loop polymer MFR$_2$, g/10 min | 6.6 | 1.0 |

TABLE 1-continued

Polymerization data of the Example and the Comparative Example

| Example | Example | Comparative Example |
|---|---|---|
| Loop polymer C2-content % by weight (mol) | 0 | 0.2 (0.3) |
| Loop XS % by weight | 5.3 | 4.7 |
| GPR Temperature, ° C. | 75 | 75 |
| GPR Pressure, Bar | 19 | 19 |
| GPR H2/C3 mol/kmol | 1.8 | 42 |
| GPR C2/C3 mol/kmol | 2.5 | 2.2 |
| Final MFR$_2$, g/10 min | 3.0 | 2.9 |
| Final C2-content % by weight (mol) | 0.2 (0.3) | 0.2 (0.3) |
| Final XS % by weight | 4.8 | 2.6 |
| Split Loop:gpr | 53:47 | 43:57 |
| Total productivity kg PP/g cat. | 20 | 14 |
| MFR$_2$ (final)/MFR$_2$ (loop) | 0.45 | 2.9 |

TABLE 3

Calculated properties for the copolymer produced in the gas phase reactor

| | Example | |
|---|---|---|
| | E | CE |
| MFR2 | 1.3 | 7.5 |
| C2-content % by weight (mol) | 0.4 (0.6) | 0.2 (0.3) |

The invention claimed is:

1. A process for polymerizing propylene in the presence of a polymerization catalyst comprising (I) a solid catalyst component comprising magnesium and titanium compounds and an internal electron donor; and (II) a cocatalyst comprising an aluminum alkyl and optionally an external electron donor, said process comprising the steps of:
  (A) continuously polymerizing propylene by introducing streams of propylene, hydrogen and said polymerization catalyst into a loop reactor at a temperature of from 65 to 100° C. and a pressure of from 25 to 100 bar to produce slurry of particles of a first homopolymer of propylene having a melt flow rate MFR$_2$ of from 3 to 20 g/10 min in a first reaction mixture;
  (B) withdrawing a slurry stream from said loop reactor, said slurry stream comprising said first reaction mixture and said particles of the first homopolymer of propylene, said particles further comprising said polymerization catalyst, and passing the slurry stream into a gas phase reactor;
  (C) continuously copolymerizing propylene by introducing streams of propylene, a comonomer selected from the group of ethylene and C4-C10 alpha-olefins and optionally hydrogen into said gas phase reactor at a temperature of from 65 to 100° C. and a pressure of from 10 to 40 bar to produce particles comprising a polymer mixture of said first homopolymer of propylene and a second copolymer of propylene, said polymer mixture having a content of comonomer units from 0.1 to 5 mol-% and a melt flow rate MFR$_2$ of from 1 to 10 g/10 min; wherein said polymer mixture comprises from 35 to 65% by weight of said first homopolymer and from 65 to 35% by weight of said second copolymer, and wherein the melt flow rate MFR2$_2$ of said polymer mixture is lower than the melt flow rate MFR$_2$ of said first homopolymer;

(D) withdrawing a stream comprising said polymer mixture from said gas phase reactor;

(E) removing hydrocarbons from said stream withdrawn from said gas phase reactor to produce a polymer stream with reduced content of hydrocarbons and optionally introducing additives to the polymer mixture; and (F) extruding said polymer mixture into pellets;

wherein the ratio of the melt index MFR$_2$ of the polymer mixture to the melt index MFR$_2$ of the first homopolymer is not higher than 0.8.

2. The process according to claim 1 wherein the loop reactor is operated at a temperature within the range of from 70 to 95° C.

3. The process according to claim 1 wherein the melt flow rate MFR$_2$ of the first homopolymer of propylene is 4 to 15 g/10 min.

4. The process according to claim 1 wherein the gas phase reactor is operated at a temperature within the range of from 75 to 95° C.

5. The process according to claim 1 wherein the melt flow rate MFR$_2$ of the polymer mixture is from 1 to 7 g/10 min.

6. The process according to claim 1 wherein the content of comonomer units in the polymer mixture is from 0.1 to 3% by mole and the content of propylene units is from 97 to 99.9% by mole.

7. The process according to claim 1 wherein said polymer mixture comprises from 40 to 60% by weight of said first homopolymer and from 60 to 40% by weight of said second copolymer.

8. The process according to claim 1 wherein the ratio of the melt index MFR$_2$ of the polymer mixture to the melt index MFR$_2$ of the first homopolymer is not higher than 0.6.

9. The process according to claim 8 wherein the ratio of the melt index MFR$_2$ of the polymer mixture to the melt index MFR$_2$ of the first homopolymer is at least 0.1.

10. The process according to claim 1 wherein the comonomer present in the second polymerization stage is ethylene.

11. The process according to claim 1 wherein the content of comonomer units in the second copolymer of propylene is from 0.3 to 1.0% by mole.

12. The process according to claim 11 wherein the absolute value of the difference in the fractions of polymer remaining soluble in xylene at 25° C. after cooling in the first homo- or copolymer and in the polymer mixture is not greater than 30% of the fraction of the polymer remaining soluble in xylene at 25° C. after cooling in the polymer mixture, wherein the fraction of the polymer remaining soluble in xylene at 25° C. after cooling is determined according to ISO 16152.

13. A process for producing a film comprising the steps of:
(1) producing a propylene polymer composition according to claim 1; and
(2) extruding said propylene polymer composition into a film.

14. The process according to claim 13 further comprising the step of orienting the film in two directions.

15. The process according to claim 1 wherein the melt flow rate MFR$_2$ of the first homopolymer of propylene is from 5 to 10 g/10 min.

16. The process according to claim 1 wherein the melt flow rate MFR$_2$ of the polymer mixture is from 2 to 5 g/10 min.

17. The process according to claim 8 wherein the ratio of the melt index MFR$_2$ of the polymer mixture to the melt index MFR$_2$ of the first homopolymer is at least 0.2.

18. The process of claim 13, wherein the ratio of the melt index MFR$_2$ of the polymer mixture to the melt index MFR$_2$ of the first homopolymer is at least 0.2 and not higher than 0.6.

19. A process for polymerizing propylene in the presence of a polymerization catalyst comprising (I) a solid catalyst component comprising magnesium and titanium compounds and an internal electron donor; and (II) a cocatalyst comprising an aluminum alkyl and optionally an external electron donor, said process comprising the steps of:

(A) continuously polymerizing propylene by introducing streams of propylene, hydrogen and said polymerization catalyst into a loop reactor at a temperature of from 65 to 100° C. and a pressure of from 25 to 100 bar to produce slurry of particles of a first homopolymer of propylene having a melt flow rate MFR$_2$ of from 3 to 20 g/10 min in a first reaction mixture;

(B) withdrawing a slurry stream from said loop reactor, said slurry stream comprising said first reaction mixture and said particles of the first homopolymer of propylene, said particles further comprising said polymerization catalyst, and passing the slurry stream into a gas phase reactor;

(C) continuously copolymerizing propylene by introducing streams of propylene, a comonomer selected from the group of ethylene and C4-C10 alpha-olefins and optionally hydrogen into said gas phase reactor at a temperature of from 65 to 100° C. and a pressure of from 10 to 40 bar to produce particles comprising a polymer mixture of said first homopolymer of propylene and a second copolymer of propylene, said polymer mixture having a content of comonomer units from 0.1 to 5 mol-% and a melt flow rate MFR$_2$ of from 1 to 10 g/10 min; wherein said polymer mixture comprises from 35 to 65% by weight of said first homopolymer and from 65 to 35% by weight of said second copolymer, and wherein the melt flow rate MFR2$_2$ of said polymer mixture is lower than the melt flow rate MFR$_2$ of said first homopolymer;

(D) withdrawing a stream comprising said polymer mixture from said gas phase reactor;

(E) removing hydrocarbons from said stream withdrawn from said gas phase reactor to produce a polymer stream with reduced content of hydrocarbons and optionally introducing additives to the polymer mixture; and (F) extruding said polymer mixture into pellets;

wherein the content of comonomer units in the second copolymer of propylene is from 0.3 to 1.0% by mole.

20. The process according to claim 19 wherein the absolute value of the difference in the fractions of polymer remaining soluble in xylene at 25° C. after cooling in the first homo- or copolymer and in the polymer mixture is not greater than 30% of the fraction of the polymer remaining soluble in xylene at 25° C. after cooling in the polymer mixture, wherein the fraction of the polymer remaining soluble in xylene at 25° C. after cooling is determined according to ISO 16152.

* * * * *